(12) United States Patent
Rifkin et al.

(10) Patent No.: US 11,556,584 B2
(45) Date of Patent: Jan. 17, 2023

(54) OPTIMAL REAL WORLD PHOTO SELECTION BY NON-PROFESSIONALS

(71) Applicant: Aircam Inc., Santa Monica, CA (US)

(72) Inventors: Evan Rifkin, Pacific Palisades, CA (US); Ryan Rifkin, Los Angeles, CA (US); David Hopkins, Santa Monica, CA (US); Jonathan Angelo, Los Angeles, CA (US); Marcus Buffet, Los Angeles, CA (US)

(73) Assignee: Aircam Inc., Santa Monica, CA (US)

( * ) Notice: Subject to any disclaimer, the term of this patent is extended or adjusted under 35 U.S.C. 154(b) by 0 days.

(21) Appl. No.: 17/710,434

(22) Filed: Mar. 31, 2022

(65) Prior Publication Data
US 2022/0374468 A1  Nov. 24, 2022

Related U.S. Application Data

(63) Continuation of application No. 17/522,533, filed on Nov. 9, 2021, now Pat. No. 11,308,153.

(60) Provisional application No. 63/192,416, filed on May 24, 2021.

(51) Int. Cl.
| | | |
|---|---|---|
| *G06F 16/583* | (2019.01) | |
| *H04N 5/232* | (2006.01) | |
| *G06Q 10/06* | (2012.01) | |
| *G06F 16/587* | (2019.01) | |

(52) U.S. Cl.
CPC ........ *G06F 16/5854* (2019.01); *G06F 16/587* (2019.01); *G06Q 10/063112* (2013.01); *H04N 5/23206* (2013.01); *H04N 5/23222* (2013.01)

(58) Field of Classification Search
CPC .. G06F 16/5838; G06F 16/951; G06F 16/583; G06F 16/532; G06F 16/5866; G06F 16/58; G06F 16/24578; G06F 16/9535; G06F 16/5854; G06F 16/51; G06F 16/54; G06F 16/248; G06F 3/0482; G06F 1/1686; G06F 3/0425; G06F 3/04845; G06K 9/6215; G06K 9/6201
See application file for complete search history.

(56) References Cited

U.S. PATENT DOCUMENTS

| | | | |
|---|---|---|---|
| 2010/0156906 A1* | 6/2010 | Montgomery | G06T 15/205 345/427 |
| 2016/0139761 A1* | 5/2016 | Grosz | H04N 1/00145 715/769 |
| 2018/0199021 A1* | 7/2018 | Herschman | H04N 21/435 |

\* cited by examiner

*Primary Examiner* — Alex Kok S Liew
(74) *Attorney, Agent, or Firm* — SoCal IP Law Group LLP; Steven C. Sereboff

(57) ABSTRACT

There is disclosed a system, apparatus and methods for optimizing photo selection. When a photographer takes photos as requested in a shot list, the photos are automatically assigned a quality score which correlates to how prominently the photo would be displayed in an online search. The photos and the quality scores are displayed to the photographer so that when the photographer has shot a sufficiently high quality photo then the photographer can stop shooting. Photos with the highest quality scores are optimal. The shot lists include reference photos, and if a new photo has a higher quality score than the corresponding reference photo, the new photo becomes the reference photo.

19 Claims, 5 Drawing Sheets

OPTIMAL REAL WORLD PHOTO SELECTION BY NON-PROFESSIONALS

RELATED APPLICATION INFORMATION

This patent is a continuation of application Ser. No. 17/522,533 filed Sep. 9, 2021, now U.S. Pat. No. 11,308,153, and claims priority from and incorporates by reference Provisional Application No. 63/192,416 filed May 24, 2021.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to optimizing selection of photos.

Description of the Related Art

Searching for desired information on the Internet is almost as old as the Internet. For some time, online search has been dominated by Google. Google and its many online search competitors provide a similar user interface (UI). The UI is quite similar regardless of device type (e.g., desktop, phone, tablet), operating system (e.g., Apple iOS, Microsoft Windows, Google Chrome), web browser or app. The user enters search criteria in a box, usually at the top of the screen, and search results are displayed in a list below the box. Advertisements are typically displayed along with search results, sometimes amidst or above search results in a manner that mimics search results.

Within a list of search results, each hit is usually separated by some white space and may be numbered. Typically, for each hit there is a vertical array of data having: a caption, a URL and a text snippet. Search results may include images. In an image search, the hit is an image, and the UI of the search results is adapted to present images more prominently than text.

With the increased popularity of mobile devices, search on mobile devices has evolved. One aspect of search which is especially popular and useful on mobile devices is local search. In a local search, a user's search criteria are geographically constrained. The geographic constraint may be explicit, implicit or a hybrid of explicit and implicit. An explicit geographic constraint may include street address, city name, postal zip code, or geographic coordinates like latitude and longitude. Examples of local searches include "hotels near me," "Beverly Hills restaurants," "best patent attorney in Los Angeles" and "Venice car rental." A search that references a product or service that is typically consumed locally, such as "restaurant" or "nail salon," is an implicit local search. Local searches on Google Search typically return organic results prefaced with a "local pack", a list of three local results, with more hits available by clicking a button. The local pack typically shows, for each hit, the name of the business and its street address, plus other useful information such as distance away and hours of operation, and links to call the business or go to its website. The search engine may include an image with a hit, which is typically either a view of the building where the business is located, a sample of products sold by the business, or a map thumbnail.

Search engines typically have ranking algorithms that determine the order in which hits are displayed. It is widely recognized that users rely upon ranking, and that user interest in a hit falls off fairly quickly. Thus, ranking is highly valuable, and can be critical in a local search.

Local search is recognized as an effective and important connection between consumers and businesses. It has been reported that 72 percent of consumers who perform a local search visit a store within five miles, and that more than three quarters of local mobile searches lead to an offline purchase. For this reason, local search is typically also integrated into mapping platforms, such as Google Maps and Apples Maps.

Because humans are naturally drawn to images over text, the images displayed from a local search can be especially important in drawing user attention. It has been reported that when doing a local search, 75% of people are more likely to use a business with photos. A source also reports that 59% of people find photos essential or extremely helpful to local search results, and that 42% more people click on directions in local search listings which have photos.

Despite the high value of quality images in local searches, automated tools have failed to produce the images, and it has been impossible to effectively scale manual photography into the images.

Apart from search, Google provides numerous data analysis tools, including Vision. Vision is an application program interface (API) which can detect objects, faces, landmarks and logos. Vision can read labels, dense text and handwriting. Vision can also build metadata such as image properties and object location. Vision includes a confidence score with some of its features, providing information about how likely it is that Vision is correct.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Figure 1:
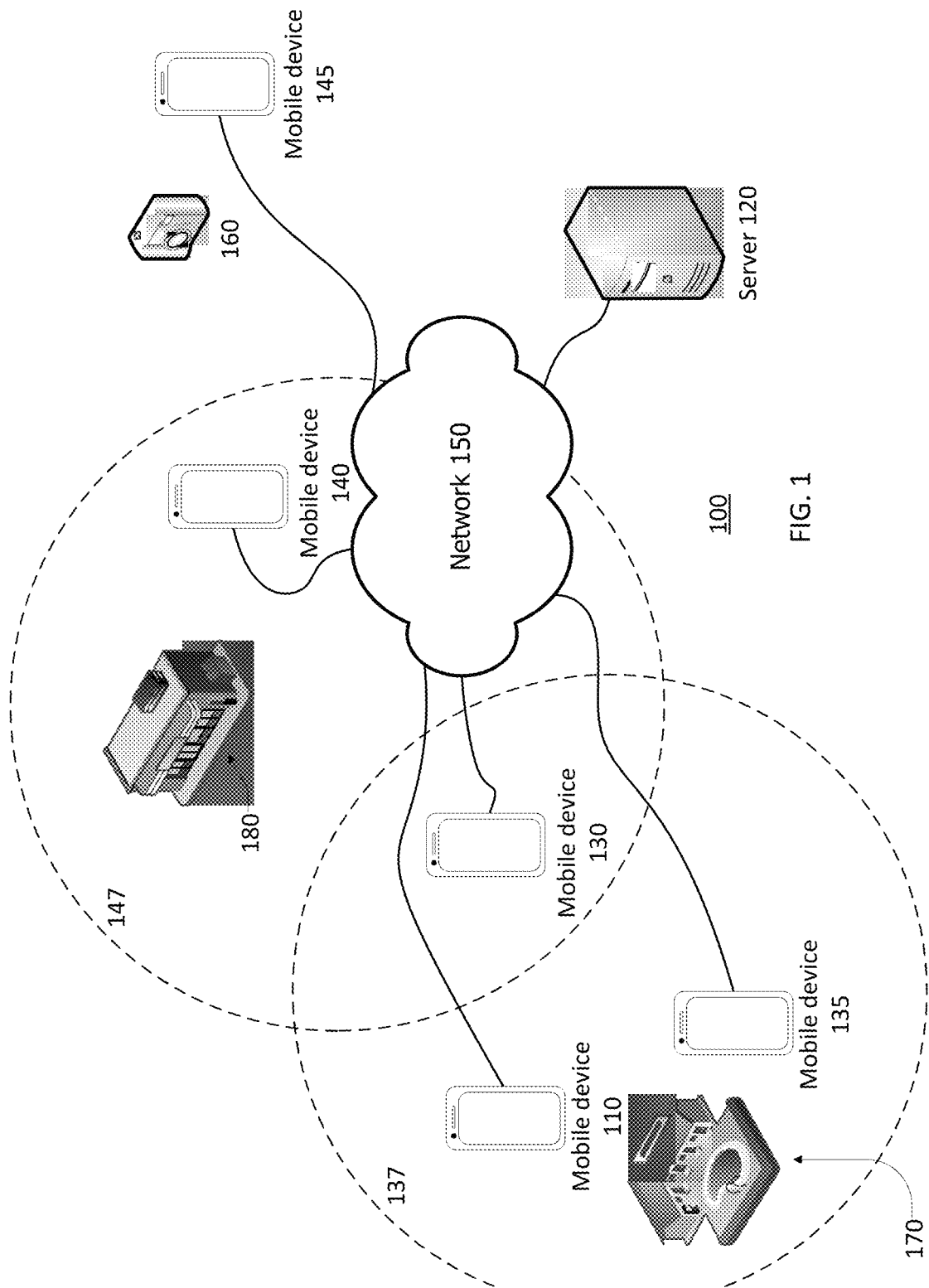
FIG. 1 is a block diagram of a system for optimizing photo selection.

Referring now to FIG. 1, there is shown a gas station 180 in a first predetermined area 147 and a motel 170 within a second predetermined area 137, though neither the gas station 180 nor the motel 170 are part of the system. Rather, the gas station 180 and the motel 170 are representative of businesses which want to be prominently displayed in an online search, and especially a local search. The gas station 180 and the motel 170 also represent real world locations. The apparatus and methods described herein provide optimal selection of photos, such as of the gas station 180, the motel 170, their environs, their parking lots, their interiors and things inside (e.g., food items), to obtain prominence in online searches.

The phrase pre-determined area means a physical location around a real world location. The pre-determined area is limited to a finite distance around the real world location and is substantially less than the world, the United States, a state or even a city. The pre-determined area may be a radius (e.g., defined by an area formed by rotating a distance from a center point of the real world location around the center point), a regular or irregular shape, and may follow geography and/or jurisdictional lines, and may correlate to an amount of time needed to get to the real-world location (e.g., within a ten minute drive, a fifteen minute public transportation ride, and/or a five minute walk). The pre-determined area may be unusually shaped to specifically include or exclude certain physical locations. The pre-determined area may have a default setting of a radius or other area of a pre-determined shape and size (e.g., 500 ft. radius or a square of a certain square footage) that is used in the absence of an alteration.

Description of Apparatus

FIG. 1 shows a system 100 having mobile devices 110, 130, 135, 140, 145 and a server 120, all interconnected by a network 150.

The mobile devices 110, 130, 135, 140, 145 may be smartphones, tablets or other portable, connected, location-aware computing devices. Each mobile device 110, 130, 135, 140, 145 either includes a camera or has access to one (e.g., through a USB connector or wirelessly). Mobile device 145 is shown with a peripheral camera 160.

Mobile devices 110, 130, 135, 140, 145 by definition are mobile and therefore are shown only temporarily in positions in FIG. 1. Some of the mobile devices may be proximate to desired real world locations, e.g., the gas station 180 and the motel 170. Mobile devices 130 and 140 are shown within the first pre-determined area 147, but mobile devices 110, 135 and 145 are not within the first predetermined area 147. Mobile devices 110, 130 and 135 are shown within a second pre-determined area 137, but mobile devices 140 and 145 are not within the second predetermined area 137.

The server 120 server is another computing device. The server 120 is designed in such a way that it is suitable for running software that stores data related to each photo uploaded to the server 120. The server 120 is shown as a single computing device. However, in implementation, the server 120 may be multiple or many computing devices. For example, the server may include an application server, a database server, a web server and/or a file server. The server 120 may be a cluster of servers and/or a cloud service or may include various devices throughout the United States or world to better serve those requesting storage and retrieval of media.

The network 150 is a computer network that provides interconnectivity between the server 120 and the mobile devices 110, 130, 135, 140, and 145. The network 150 may be or include the internet, wired connection and/or wireless connections. The network 150 may rely upon well-known protocols for the interconnection of computing devices such as TCP/IP, Ethernet, Bluetooth, and other protocols. The network 150 enables the mobile devices 110, 130, 135, 140 and 145 to communicate with the server 120.

Figure 2:
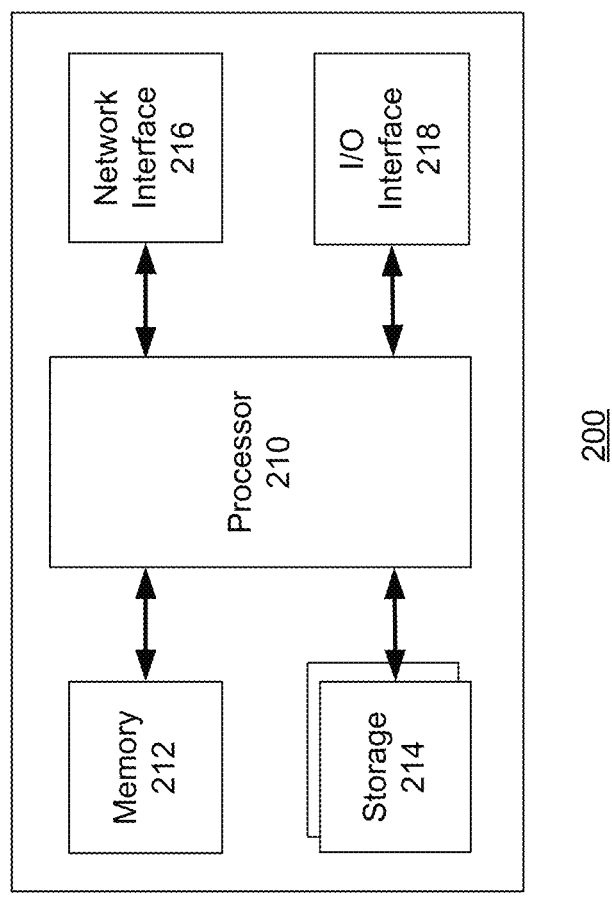
FIG. 2 is a block diagram of a computing device.

Turning now to FIG. 2 there is shown a block diagram of a computing device 200, which is representative of the mobile devices 110, 130, 135, 140, 145 and the server 120. The computing device 200 has a processor 210 coupled to a memory 212, storage 214, a network interface 216 and an I/O interface 218. The computing device 200 includes software and hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein. For example, a global positioning system (GPS) receiver or similar hardware of device 200 may provide location-based services that generate location data of device 200.

The processor 210 may be or include one or more microprocessors, field programmable gate arrays (FPGAs), application specific integrated circuits (ASICs), programmable logic devices (PLDs) and programmable logic arrays (PLAs).

The memory 212 may be or include RAM and ROM, and may include firmware, such as static data or fixed instructions, BIOS, system functions, configuration data, and other routines used during the operation of the computing device 200 and processor 210. The memory 212 also provides a storage area for data and instructions associated with applications and data handled by the processor 210. As used herein the term "memory" corresponds to the memory 212 and explicitly excludes transitory media such as signals or waveforms.

The storage 214 provides non-volatile, non-transitory, bulk or long-term storage of data or instructions in the computing device 200 and may be solid state. The data or instructions stored may be executed by processor 210 to provide functionality and features described herein. Multiple storage devices may be provided or available to the computing device 200. Some of these storage devices may be external to the computing device 200, such as network storage or cloud-based storage. As used herein, the terms "storage" and "storage medium" correspond to the storage 214 and explicitly exclude transitory media such as signals or waveforms. In some cases, such as those involving solid state memory devices, the memory 212 and storage 214 may be a single device.

The network interface 216 includes an interface to a network such as network 150 (FIG. 1). The network interface 216 may be wired or wireless.

The I/O interface 218 interfaces the processor 210 to peripherals (not shown) such as displays, cameras, keyboards and USB devices.

Figure 3:
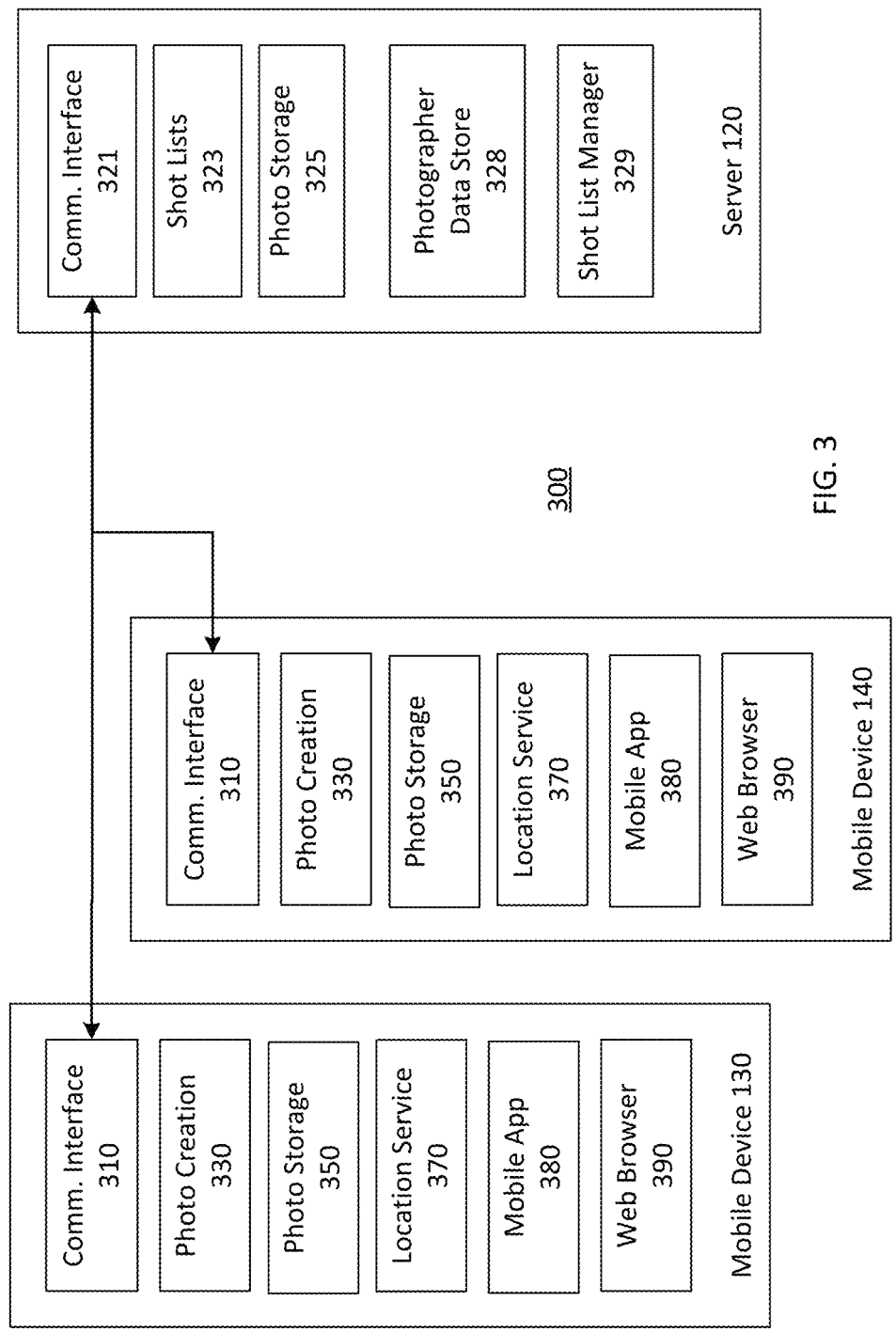
FIG. 3 is a functional diagram of a system for optimizing photo selection.

FIG. 3 is a functional diagram of a system 300 for optimizing photo selection for online searches, which may be the system 100 of FIG. 1. The system 300 includes the mobile device 130, the mobile device 140 and the server 120. These mobile devices 130, 140 are shown because they are within the first pre-determined area 147 (FIG. 1) and are therefore proximate to a real world location where photos are to be taken.

The mobile device 130 includes a communications interface 310, a photo creation service 330, photo storage 350, a location service 370, mobile application (app) 380 and a web browser 390. The mobile device 140 has the same components 310, 330, 350, 370, 380, 390.

The communications interface 310 is software that enables the mobile device 130 to communicate with the server 120. The communications interface 310 may operate as application programming interface (API) calls to the server's corresponding communications interface 321. Alternatively, the communications interface 310 may operate as one or more typical hypertext transfer protocol (secure) (HTTP(S)) requests or similar requests made between the communications interface 310 and the communications interface 321 of the server 120.

The communications interface 310 enables the mobile device 130 to upload photos and device location information (e.g., from the GPS), along with any location information pertaining to the photos, to the server 120. As used herein, the term photo means a picture of a real world object or scene, made using a camera, taken by a human operator or timer of the camera, and stored digitally. The communications interface 310 may also enable updates and information stored on the server 120 to be accessed by the mobile device 130. The communications interface 310 may also enable communications with other mobile devices and/or other network devices including the internet.

The photo creation service 330 is software that enables photos to be created. This software 330 may include camera image capture and storage software, and/or software for obtaining photos from a camera peripheral of the mobile device 130 (e.g., as with mobile device 145 and camera 160).

The photo storage 350 is storage for photos created by the photo creation service 330. The photo storage 350 may include memory or a storage medium for storing the photos, but may also include software for managing data associated with the photos. The data associated with a particular photo may include metadata such as image quality (e.g., resolution) and location data for a location at which the photo was taken, such as provided location service 370.

The location service 370 is software that may rely upon hardware such as a GPS receiver or wireless-receiver network hardware for assisted location and obtains the current location of the mobile device 130. The location service 370 may be "always-on" or may operate on an as-needed basis when a photo is created or captured. The location service 370 may store the location a photo was captured or created in conjunction with the media itself. This location may be stored along with the photo media in the photo storage 350.

The mobile app 380, also referred to herein as the photo communication program, provides functions for a photographer using the mobile device to upload photos tied to a specific device location. The mobile app 380 may utilize the other functions of the mobile device 130 in order to implement some of the functions and processes described herein. For example, the mobile app 380 may enable photos to be captured, stored, and uploaded to the server 120 in conjunction with a pre-determined area along with settings that may or may not be available to a web browser user.

The web browser 390 is software that enables the mobile device 130 to access the world wide web and server 120. The web browser 390 may also be used to provide some or all of the functionality provided by the mobile app 380, including upload of photos to the server 120. Mobile app 380 and web browser 390 may communicate with server 120 using interface 310.

The server 120 includes a communications interface 321, a shot list data store 323, photo storage 325, a data store of photographer information 328 and a shot list manager 329.

The communications interface 321 is substantially similar to the communications interface 310 except that the communications interface 321 is designed in such a way as to be capable of handling communications requests, data transmissions, and upload of media from many hundreds or thousands of mobile devices substantially simultaneously. The communications interface 321 may include authentication systems suitable for enabling mobile devices, such as mobile device 130, to login or otherwise authenticate themselves to the server 120 before they may perform some functions using the server 120. The authentication may be using mobile app 380 or web browser 390.

The shot list data store 323 stores data related to photos to be taken. This data is used to create shot lists and assign them as jobs to mobile devices. A shot list includes information of a plurality of requests for photos to be taken. For each requested photo in a shot list, the shot list data store 323 has a reference image showing what the requested photo shot should look like, and a textual description of at least one object required to be included in the photo. Requests may also include a desired camera angle for the photo to be taken, and a minimum image quality of the photo to be taken. The shot list may also include a time period in which the photos are to be taken or a deadline for submission. The reference photo may have a quality score which tells how well the reference photo satisfies the requirements.

For example, there may be a generic shot list for a chain of gas stations having dozens, hundreds or even thousands of stores. The shot list requests photos of the outside of gas station and of the convenience store inside the gas station. The requested outside photos would provide a street view and a view showing the gas pumps. The inside photos might would show that the shelves are well stocked with snacks, and the refrigerator cases are well stocked. Thus, the shot list has reference photos of these various views, along with one or more keywords per photo such as "gas pumps" for an outside view, "snacks" and "beverages" for the inside views. Thus, the gas station 180 is one of site of the gas station chain. Another generic shot list is for a chain of motels. The shot list requests exterior and interior photos, showing such things as the exterior of the motel, its swimming pool and its parking lot, and interior photos showing a room, the restaurant and select menu items. The shot list for the motel chain includes reference photos for each such requested photo and corresponding keywords. Thus, the motel 170 is one site of the motel chain.

A job includes a shot list and a real world location where the photos in the shot list are to be taken. For a gas station chain or a motel chain, the real world location might be the addresses of all of the gas stations or motels in the chain, or select sites. Instead of an address there could be another geolocator, such as precise longitude and latitude.

The photo storage 325 is storage, such as hard drive space, removable disc, flash memory, data stored in memory on a server, or other long-term storage for photos. Photos taken by photographers as described herein may be stored in the photo storage 325. The photo storage 325 may also store the reference photos. Photo storage 325 is shown as separate from the shot list data store, though these may be a single software and hardware combination.

The photographer data store 328 stores photographer-related data such as name, usual location/area, current location and skill level.

The shot list manager 329 manages the shot list data store 323 and uses the photographer data store 328 to prepare shot lists and assign jobs to photographers.

Figure 4:
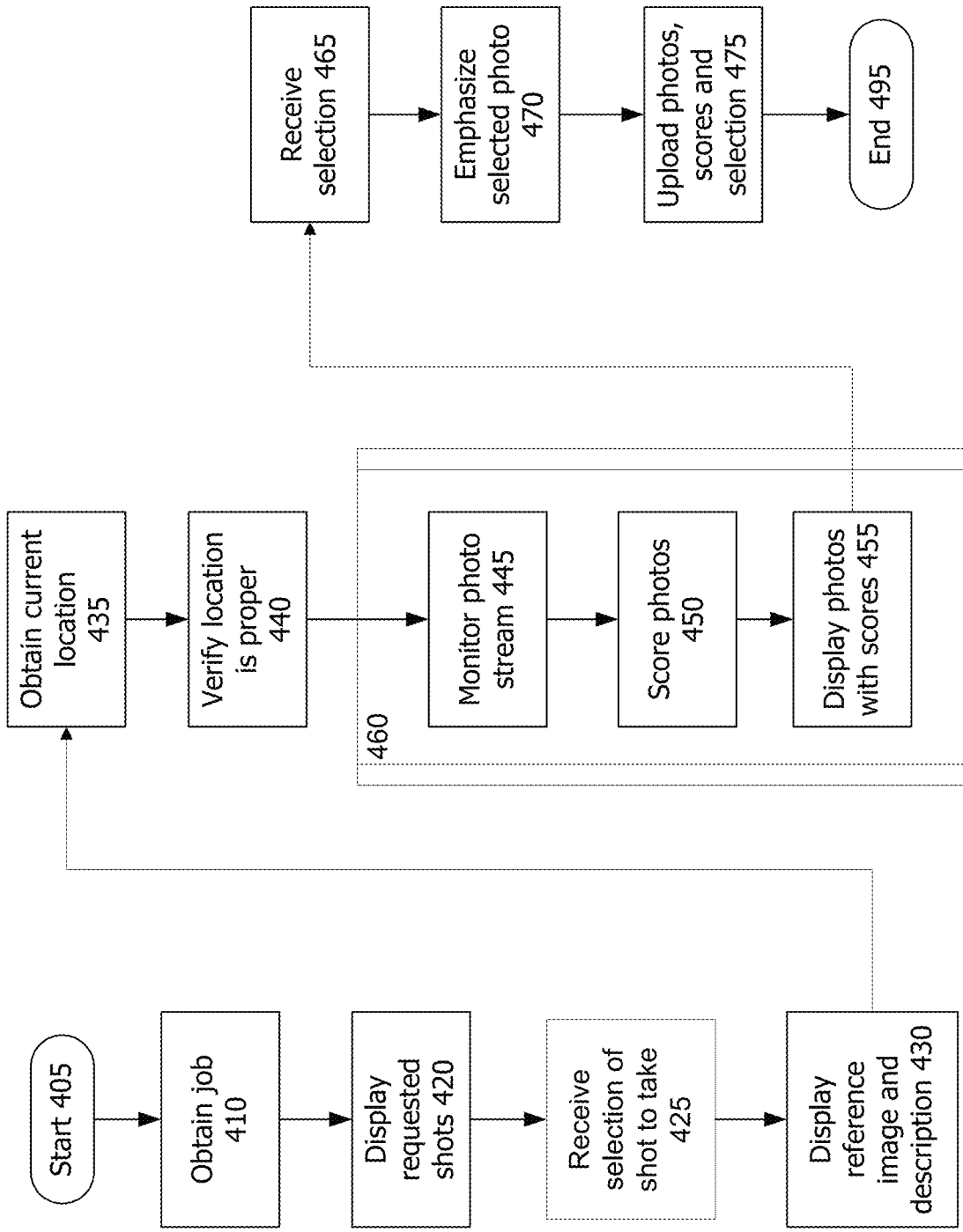
FIG. 4 is a flowchart of operation of the photo communication program.

Referring now to FIG. 4, there is shown a flowchart of operation of the photo communication program. The photo communication program may be the mobile app 380 (FIG. 3) running on the photographer's mobile device 130. The flow chart has both a start 405 and an end 495, but the process is cyclical in nature.

In a first step 410, the photo communication program obtains a job for the photographer from a remote server, which may be the server 120. The job may be from shot list data store 323 and the reference images from photo storage 325.

The photo communication program may obtain the job at the request of the photographer, or the job may be pushed to the photo communication program. The photographer may use the photo communication program to interact with the server 120 in selecting one or more jobs to receive. The job at 410 may include an indication of whether a photo satisfying the request has previously been taken by the photographer, such as noted at 450.

The photo communication program then, in step 420, displays the requested photos. The photo communication program may display the requested photos altogether, or may display them individually, or in related groups such as all exterior shots or all still lifes.

Next, in step 425, the photo communication program receives a selection from the photographer of one of the requests. That is, the photographer decides what they want to shoot from amongst the requested photos in the job's shot list.

The mobile device then in step 430 displays the reference image and the textual description (e.g., keywords) of the selected request for the photographer to see. The display may be through the photo communication program. Steps 420, 425 and 430 may be combined, such that the photo communication program displays requested photos and descriptions together, and the photographer selects one request. Furthermore, shot selection (step 425) might be omitted where it is possible to match photos taken by the photographer to requested photos.

The photo communication program in step 435 obtains a current location of the mobile device from the mobile device. The photo communication program might have obtained the mobile device's current location prior to providing the shot list, but this might have been for matching the photographer to the job so the mobile device might have been close to the requested location (e.g., the job's real world location) for shooting but not on-site or in the area. Furthermore, the photographer might be provided a job even though the photographer is some distance from the job's requested location, with the expectation that the photographer would go to the job's requested location.

The photo communication program may then verify in step 440 that the current location of the mobile device is the job's requested location. There may be a tolerable variance in the current location versus the requested location which may be obtained by generalizing the current location and/or the requested location. The tolerance may vary based upon the nature of the requested location, with smaller tolerances in more dense locations. The tolerance may be an area as noted for areas 137 and 147.

If the mobile device is not at the requested location, then the photographer presumably cannot take the requested photo. In such case, an error message may be displayed and the photographer provided with directions to the location where the requested photos in the job are to be taken. If the photographer is on site, they can proceed to shoot the requested photos.

The photographer may shoot photos in a number of ways. For one, the photo communication program may include camera functionality which allows the photographer to use the mobile device as a camera and capture photos directly into the photo communication program. Another option is for the photographer to use a different app in the mobile device for shooting photos. Another option is for the photographer to use a separate device to shoot the photos, such as a stand-alone camera, as a peripheral to the photographer's mobile device and in that case the photos would be transmitted automatically from the peripheral to the photographer's mobile device.

As the photographer shoots, in step 445 the photo communication program monitors the stream of photos received into the mobile device as taken by the photographer. This monitoring occurs in a real time, such concurrently with the photographer shooting, so that the photo communication program has access to the photos.

Synchronously with receipt of each photo into the mobile device, in step 450 the photo communication program automatically assigns a quality score to each photo. The quality score tells whether the photo has the required object which is in the selected request, whether the requested object is prominent, and whether the object matches the requested description. For example, a photo requested for a restaurant might request a stack of pancakes and a coffee mug, and a photo showing pancakes and a coffee mug both in the foreground would score higher than a photo showing either in the background or obscured. The quality score may also consider a camera angle for the photo and/or an image quality of the photo taken. A photo with a camera angle closer to the desired camera angle for the photo to be taken will have a higher quality score. A photo with an image quality further above the minimum image quality of the photo to be taken will have a higher quality score.

To score a photo, the photo communication program may submit the photo to an artificial intelligence (AI) engine, such as Google Vision. Using the analysis from the AI engine, the photo communication program may then compare what the AI engine has detected and identified in the photo (e.g., real world objects) to the shot request. The photo communication program may also consider with the AI engine's assessment of how prominent an identified object is in the photo, and the AI engine's confidence of its assessments. The AI engine may also consider a camera angle for the photo and/or an image quality of the photo taken.

The AI engine used in support of scoring photos may be the same AI engine used by an online search engine. Thus, even if the online search engine relies upon an AI engine which is flawed, the flaws will likely be incorporated into the quality score. Accordingly, by selecting photos which score highly using the same AI engine as an online search engine, the selection of photos is optimized for the online search engine.

Scoring as described herein also provides real-time keyword verification. Each requested photo is accompanied with a textual description of one or more objects to be included in the photo. These textual descriptions may be keywords—the same keywords which people might be expected to use in an online search. Here again, the quality score not only reflects whether a photo has the keyword, but if the same AI engine is used for both scoring photos through the photo communication program and in later online searches, the photo selection is optimized to get a great photo for the online search. Thus, the quality score correlates to how prominently the photo would be displayed in an online search. The scoring and/or keywords may include an indication of whether a photo satisfying the request has been taken by the photographer.

Selecting a photo with a high quality score improves upon typical selection of photos for a website. By selecting a photo with a high quality score, photo selection for a website is optimized.

Synchronously with assigning the scores at 450, in step 455 the photo communication program causes the photos from the stream to be displayed on the mobile device with their respective quality scores for viewing by the photographer. The display of the scored photos may be in a screen display generated by the photo communication program. The display may be in a different app, for example with the photo communication program pushing the scored photos into the app or adding the quality scores into photos which the app displays. The different app may be the app used to capture the photos at 445.

Steps 445, 450 and 455 are shown within a subroutine box 460 because these three steps are performed together for each requested shot the photographer is seeking to provide. Because the quality score for each photo is shown in real time, the photographer knows when they have taken a good photo or one that exceeds a certain desired or required quality score. That is, this process allows the photographer to stop shooting when the photographer has taken a photo that satisfies the job's requirements and has a high quality score. As a result, the photographer can spend less time shooting. Furthermore, the photographer has little if any risk of a need for a later re-shoot. Re-shoots can be especially expensive because they typically require the photographer to return to the specified location. The delays and extra time spent can be highly burdensome. Instead, when the photographer has selected a high quality photo, they can be confident that they have satisfied the requirements of the shot list for the requested photo.

In some cases, the photographer takes a single photo, the photo communication program scores the photo highly, and the photographer takes no further photos to satisfy the pending request. In a more typical situation, the photographer shoots a number of photos per request and pauses periodically to see the score on the photos. The photographer may shoot a small number of photos such as 5-10, or a large number such as 20-100, before pausing. The shot list may specify a minimum number of photos to be taken by the photographer for each request.

When the photographer is satisfied with at least one of the photos, in step 465 the photographer indicates to the photo communication program their selected photo. Although the photo communication program could automatically select the best photo, it may be better to allow the photographer to exert some human judgment. The photo communication program may automatically filter or sort the photos to assist the photographer, such as eliminating low-scored photos and sorting photos by score. This may eliminate photos below a threshold score and display the rest from best to worst quality. The photo communication program may further assist selection by the photographer by highlighting in the photos the required objects, or highlighting the photo(s) with the highest quality scores. The photo communication program may propose a photo for selection, such as the highest quality scoring photo, such that the photographer need only confirm the proposal.

After the photographer has selected one of the photos, the photo communication program next in step 470 may modify the display of the scored photos to emphasize the selected photo. That is, the photo communication program may hide the non-selected photos, place the selected photo in front of the others, or make the selected photo larger in the display. The photo communication program also, in step 475, uploads the photos, quality scores and selections to the server 120. The uploaded photo and photographer data (e.g., current location of mobile device 130) may be stored in photo storage 325 and photographer data store 328, respectively.

Another benefit of this process is that it allows for automatic improvement of the shot lists. That is, if the quality score of the selected photo is higher than the quality score of the reference image of the selected request, the selected image automatically becomes the new reference image for the selected request in shot lists provided to the same and other photographers for later shoots. In this way, the data store is self-improving.

Figure 5:
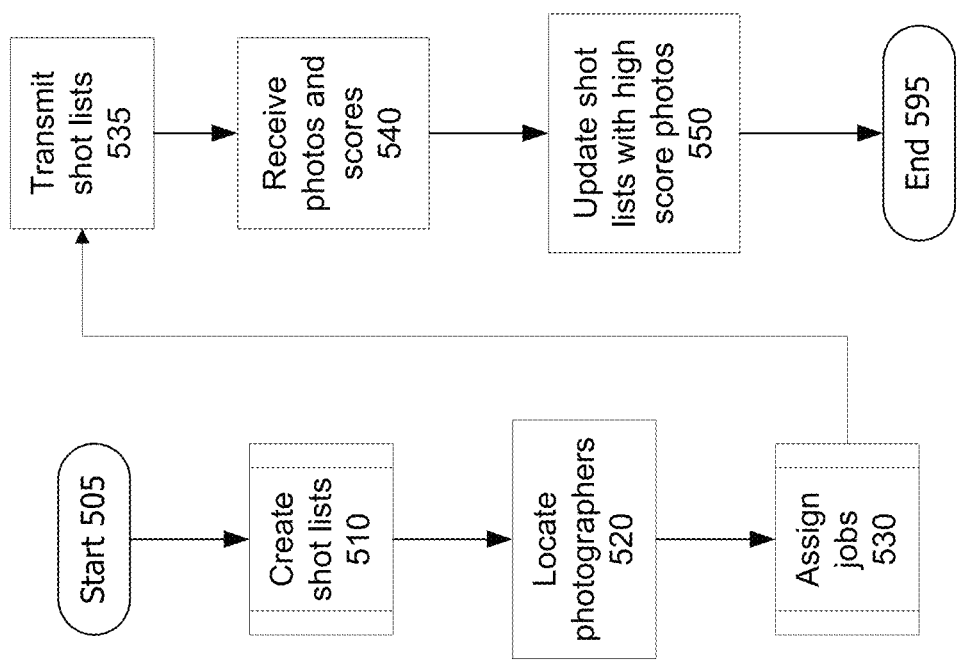
FIG. 5 is a flowchart of a server supporting photographers using the photo communication program.

Referring now to FIG. 5, there is shown a flowchart of a server supporting photographers using the photo communication program on their mobile devices. This is the server-side counterpart to the process of FIG. 4 and may use server 120. Whereas the process of FIG. 4 is with respect to a single photographer, the process of FIG. 5 shows that the server supports numerous photographers (e.g., who operate devices such as mobile device 130) whom may be working concurrently. The photographers may have accounts with the server through which the photographers share their respective current location information from their respective mobile devices and also the photos they shoot in response to shot lists provided to them. The accounts may be accessed using mobile app 380 and/or web browser 390 through a website of the server 120. The server-side counterpart may be a program running on the server 120 (FIG. 3). The flow chart has both a start 505 and an end 595, but the process is cyclical in nature.

The work of the server includes creating jobs for the photographers (step 510). The jobs may be created on demand by the photographers, in advance such as by a person ordering the photos, or by a hybrid. Generally, motivation for taking photos comes from a person or business which wants the photos, so the shot lists and jobs are created in advance, such as by creating at least the high level aspects of the real world location of the photos and the desired photos. Subsequently, in step 520, the server obtains the current location of the mobile devices of the photographers.

In step 530, the server assigns jobs to the photographers. Job assignment may be based upon, at least, proximity of the respective current locations of the mobile devices of the photographers and a real world location of the job. That is, the server may match photographers to jobs based upon location. Assignment of photographer may consider other factors, such as photographer expertise (e.g., still lifes versus landscapes), photographer skill level, records of photographer quality, and photographer preferences for things such as type of shoot, fees and locations. Assignment of photographers may include an auction, in which a given job is offered to a number of photographers who bid on the job, and the photographer who bids the lowest fee wins the job. If a photographer has been assigned a job and declines the jobs, or the photographer fails to produce on time or produces inadequate photos, the same job may be assigned to a different photographer.

The server may have in the photographer data store 328 information on dozens, hundreds or thousands of professional photographers to select a great photographer for each job. Likewise, the photographers may have, through the mobile app 380, turnkey scheduling tools that allow them to share preferences to ensure they get the jobs they want.

In step 535 the server transmits the assigned jobs to the mobile devices (e.g., mobile device 130) of the respectively assigned photographers. The server may cause the jobs to be transmitted to the mobile devices directly or indirectly. Both assignment 530 and job transmission 535 may be performed in batches, in real time or staggered. The timing of assignment and transmission of a given job may be based upon timing requirements of the job, such as a deadline. The transmitted job may be obtained by the photographer at 410.

In step 540 the server receives the photographers' photo selections taken in response to the respective job. Because the photographers may work at different times, this step 540 may occur at different times. The received photo selections may be received from selections at 465.

Subsequently in step 550 the server compares the quality scores of the received photos with the quality scores of the reference images. If a received photo has a higher quality score than the corresponding reference image, the received photo become the reference image so that when the server sends a shot list later, the reference image is better.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of operating a photo communication program on a mobile device of a photographer to optimize photo selection, the method comprising:
   the photo communication program obtaining, from a remote server, a job assigned to the photographer from amongst a plurality of photographers, the job comprising a shot list comprising information of one or more requests for photos to be taken including, for each request, a reference image and a textual description of at least one object required to be included in the photo;
   if the job has plural requests, the photo communication program receiving a selection from the photographer of one of the requests;
   the mobile device displaying the reference image and the textual description of at least one of the selected requests;
   the photo communication program, after receiving the selection of one of the requests, receiving a plurality of photos from the photographer and corresponding to the request;
   the photo communication program, in response to receiving the plurality photos, automatically assigning a quality score to each of the photos, the quality score indicating of whether the photo prominently has the required object which is in the selected request;
   the photo communication program causing the received photos to be displayed on the mobile device with their respective quality scores for viewing by the photographer;
   the photo communication program receiving a selection of one of the scored photos by the photographer; and
   in response to the selection of the scored photo, the photo communication program modifying the display of the scored photos to emphasize the selected photo and uploading the selected scored photo to the remote server.

2. The method of claim 1 wherein assigning a quality score comprises:
   detecting, by an artificial intelligence engine, presence of real world objects detected and identified in the photo,
   determining, by the artificial intelligence engine, a desired number of the object detections and identifications, and
   determining a respective prominence, as determined by the artificial intelligence engine, of the identified objects in the photo.

3. The method of claim 1 wherein the photographer shoots a series of photos and then pauses.

4. The method of claim 1 wherein the photographer shoots one photo at a time.

5. The method of claim 1 wherein the requests include a desired camera angle for the photo to be taken, and a minimum image quality of the photo to be taken.

6. The method of claim 1 wherein the shot list includes an indication whether a photo satisfying the request has been taken by the photographer.

7. The method of claim 1 wherein the photographer is assigned the job based upon a current location of the photographer.

8. The method of claim 1 wherein a quality score of the reference photo is displayed with the display of the reference photo.

9. An apparatus comprising a non-volatile machine-readable medium storing a photo communication program having instructions which when executed by a processor will cause the processor to optimize photo selection, the instructions of the photo communication program for:
   obtaining, from a remote server, a job assigned to the photographer from amongst a plurality of photographers, the job comprising a shot list comprising information of one or more requests for photos to be taken including, for each request, a reference image and a textual description of at least one object required to be included in the photo;
   if the job has plural requests, receiving a selection from the photographer of one of the requests;

causing the mobile device to display the reference image and the textual description of at least one of the selected requests;

after receiving the selection of one of the requests, receiving a plurality of photos from the photographer and corresponding to the request;

in response to receiving the plurality photos, automatically assigning a quality score to each of the photos, the quality score indicating of whether the photo prominently has the required object which is in the selected request;

causing the received photos to be displayed on the mobile device with their respective quality scores for viewing by the photographer;

receiving a selection of one of the scored photos by the photographer; and in response to the selection of the scored photo, modifying the display of the scored photos to emphasize the selected photo and uploading the selected scored photo to the remote server.

10. The apparatus of claim 9 wherein assigning a quality score comprises:

detecting, by an artificial intelligence engine, presence of real world objects detected and identified in the photo, determining, by the artificial intelligence engine, of the object detections and identifications, and determining a respective prominence, as determined by the artificial intelligence engine, of the identified objects in the photo.

11. The apparatus of claim 9 wherein the photographer shoots a series of photos and then pauses.

12. The apparatus of claim 9 wherein the photographer shoots one photo at a time.

13. The apparatus of claim 9 wherein the requests include a desired camera angle for the photo to be taken, and a minimum image quality of the photo to be taken.

14. The apparatus of claim 9 wherein the shot list includes an indication whether a photo satisfying the request has been taken by the photographer.

15. The apparatus of claim 9 wherein the photographer is assigned the job based upon a current location of the photographer.

16. The apparatus of claim 9 wherein a quality score of the reference photo is displayed with the display of the reference photo.

17. The apparatus of claim 11 further comprising:

a user input device a display device a processor a memory wherein the processor and the memory comprise circuits and software for performing the instructions on the storage medium.

18. A method of operating a photo communication program on a mobile device of a photographer to optimize photo selection, the method comprising:

the photo communication program obtaining, from a remote server, a job assigned to the photographer from amongst a plurality of photographers, the job comprising a shot list comprising information of plural requests for photos to be taken including, for each request, a reference image and a textual description of at least one object required to be included in the photo;

the mobile device displaying the reference image and the textual description of at least one of the requests;

the photo communication program receiving a plurality of photos from the photographer corresponding to at least one of the requests;

the photo communication program, in response to receiving the plurality photos, matching at least one of the photos from the photographer to one of the requests;

automatically assigning a quality score to each of the matched photos, the quality score indicating of whether the matched photo prominently has the required object which is in the corresponding request;

the photo communication program causing the matched photos to be displayed on the mobile device with their respective quality scores for viewing by the photographer;

the photo communication program modifying the display of the scored photos to emphasize, with respect to the requests, the matched photo having the highest score, and uploading the highest scored photo to the remote server.

19. The method of claim 18 wherein assigning a quality score comprises:

detecting, by an artificial intelligence engine, presence of real world objects detected and identified in the photo, determining, by the artificial intelligence engine, of the object detections and identifications, and determining a respective prominence, as determined by the artificial intelligence engine, of the identified objects in the photo.

\* \* \* \* \*